United States Patent [19]

Nixon

[11] Patent Number: 5,395,473
[45] Date of Patent: Mar. 7, 1995

[54] BONDED SEAT ASSEMBLY

[75] Inventor: James F. Nixon, Windsor, Canada

[73] Assignee: General Motors Corporation, Detroit, Mich.

[21] Appl. No.: 116,598

[22] Filed: Sep. 7, 1993

[51] Int. Cl.6 .......................... B32B 31/12; B32B 31/20
[52] U.S. Cl. ...................................... 156/291; 156/285; 297/452.62
[58] Field of Search ................ 156/291, 290, 228, 285; 297/452.62

[56] References Cited

U.S. PATENT DOCUMENTS

| | | | |
|---|---|---|---|
| 3,654,019 | 4/1972 | Cusick | 156/285 |
| 3,878,020 | 4/1975 | Huffaker | 156/291 |
| 4,229,240 | 10/1980 | Borgiani | 156/291 |
| 4,692,199 | 9/1987 | Kozlowski et al. | 156/245 |
| 4,708,760 | 11/1987 | Mark | 156/251 |
| 4,795,517 | 1/1989 | Elliot | 156/242 |
| 5,000,805 | 3/1991 | Lowe | 156/90 |
| 5,100,732 | 3/1992 | Benefiel | 428/457 |
| 5,236,243 | 8/1993 | Reyes | 297/218 |

Primary Examiner—Michael W. Ball
Assistant Examiner—Daniel J. Stemmer
Attorney, Agent, or Firm—George A. Grove

[57] ABSTRACT

Seat cushions and backs comprising a foam bun and a trim cover are made by applying a molten hot melt bead to the trim cover or the foam bun in a predetermined pattern that matches or produces style conformations in the seating portion, pressing the trim cover and the foam cushion together in localized areas within a predetermined amount of time with a tool that has rails arranged in the same predetermined pattern to establish intimate contact of the cover and bun with the hot melt bead, and holding the trim cover and the foam cushion in intimate contact with the hot melt bead for a predetermined amount of time while the hot melt bead cools and bonds the trim cover to the foam cushion beneath the style conformations. The tool or at least the rails preferably provide a heat sink to facilitate cooling the hot melt adhesive bead. The bonding method can be used with a wide variety of seating materials including heat-sensitive seating fabrics and laminates and foam-backed seating materials.

21 Claims, 5 Drawing Sheets

BONDED SEAT ASSEMBLY

BACKGROUND OF THE INVENTION

This invention relates generally to seat assemblies and more particularly to seat assemblies for automobiles and the like that comprise a trim cover and a foam cushion commonly referred to as a bun.

In the past, trim covers, particularly cut and sewn type trim covers, have been attached to foam cushions by hook and loop fasteners, also known as Velcro fasteners. In these known constructions, the foam cushions generally have a central seating portion defined by elongated recesses. Strips of hook fasteners are secured to the bottoms of these elongated recesses by adhesives or insert molding operations so that the hooks extend up into the elongated recesses. The trim covers, on the other hand, have strips of loop fasteners secured to their bottom or inside surfaces. In the case of cut and sewn type trim covers, the strips are secured to the salvage ends that are formed when abutting side edges of adjacent panels are sewn together. In any event, the trim cover is attached to the foam cushion by aligning the strips of loop fasteners on the bottom of the trim cover with the strips of hook fasteners in the recesses of the foam cushion and then pressing the trim cover in place so that the loop and hook fasteners interlock. An example of such a system is disclosed in U.S. Ser. No. 07/859,791 filed Mar. 30, 1992 and assigned to General Motors Corporation.

This hook and loop fastener system works well. However, it is a relatively expensive process for several reasons including the cost of the fasteners themselves, the cost of attaching the fasteners to the trim cover and the foam cushion and the cost of engaging the cooperating fasteners to each other, which is essentially a manual operation.

U.S. Pat. No. 4,692,199 granted to Eric F. Kozlowski and Edmund R. Kruger on Sep. 8, 1987 discloses another method of attaching trim covers to foam cushions. In this method, a vacuum is applied to a porous contoured mold to draw an impervious adhesive film against a fabric or cloth trim cover to conform the trim cover to the contours of the mold surface. A foam cushion is then pressed against the adhesive film and the trim cover while heated fluid is passed through the porous mold and the fabric trim cover to diffuse the adhesive film into the trim cover and the foam cushion and thus bond the trim cover to the foam cushion. A second vacuum is then applied through the foam cushion to remove moisture residue resulting from the steam and to cool and cure the adhesive.

This method has several drawbacks. A major drawback is that this method requires passing heated fluid, such as steam, through a porous fabric trim cover to bond the foam bun to the trim cover. Because of this heating requirement, the process and the tooling for the process are relatively expensive; the trim cover and any backing are susceptible to shrinkage and delamination; and the nap of fabric trim covers can be distorted limiting the types of fabric that can be applied with the process. Another drawback is that this method does not tolerate dimensional variations very well and consequently tight tolerances for the trim cover and the foam bun are required. Another drawback is that the method is very sensitive to the surface characteristics of the foam bun or cushion.

There is also another drawback when the process is used in making a sculptured seat having a cut and sewn trim cover applied to a foam bun having deep styling grooves. The process often requires plastic locating strips sewn in the style line seams that are formed when adjacent panels of the trim cover are sewn together. These plastic strips are needed to register the style line seams with style line grooves in the foam bun. These plastic strips add further material and manufacturing cost. The plastic strips are also a possible source of discomfort to the seat occupant because remnants beneath the stitching remain in the finished seat.

U.S. Pat. No. 5,005,805 granted to Michael E. Lowe on Mar. 19, 1991 discloses yet another method of attaching permeable fabric trim covers to foam cushions. In this method, a sheet of polyolefin film is positioned on one side of a permeable fabric or cloth trim cover to form a composite that is vacuum drawn against a vacuum forming tool fixture to conform the composite to a shaped surface of the tool fixture. A foam cushion having an adhesive layer applied to a shaped surface is then pressed against the composite while steam heat is applied to the tool fixture to deteriorate the polyolefin film and allow the adhesive layer to bond the foam cushion to the fabric trim cover.

This method also has several drawbacks that are more or less the same as those discussed above. One more or less common drawback is that this method also requires passing heated fluid, such as steam, through a porous fabric trim cover to bond the foam bun to the trim cover. This heating requirement has the same adverse effects noted above, namely, the process and the tooling for the process are relatively expensive; the trim cover and any backing are susceptible to shrinkage and delamination; and the nap of fabric trim covers can be distorted, limiting the types of fabric that can be applied with the process.

Another common drawback is that this method does not tolerate dimensional variations very well either, and consequently tight tolerances for the trim cover and the foam bun are still required. Moreover, this process still requires plastic locating strips sewn in the style line seams of the trim cover to register the style line seams with style line grooves in the foam bun in some instances. These plastic strips add further material and manufacturing cost and a possible source of discomfort to the seat occupant as noted above.

SUMMARY OF THE INVENTION

The object of this invention is to provide a seat comprising a trim cover and a foam cushion and a method for manufacturing such a seat that avoids one or more of the drawbacks noted in connection with the methods described above.

A feature and advantage of the invention is that the method of manufacturing the seat is very versatile so that any type of seating material covering can be used including all types of fabrics.

Another feature and advantage of the invention is that the method of manufacturing the seat does not require any flow of heated fluid or other external application of heat when the trim cover is in place to activate an adhesive so that any type of permeable seating fabric can be used in the trim cover.

Another feature and advantage of the invention is that the method of manufacturing the seat construction employs a hot melt adhesive so that a great variety of materials can be used for the trim cover including heat-sensitive fabrics and foam-backed materials.

Yet another feature and advantage of the invention is that the method of manufacturing the seat tolerates considerable trim cover and foam surface variation because the method employs a hot melt adhesive bead and localized pressure that adheres the trim cover to the foam bun solely at the primary styling feature lines.

Still yet another feature and advantage of the invention is that the trim cover is adhered to the foam bun by pressing the two together with tooling that matches the pattern of a hot melt adhesive bead between the trim cover and the foam bun and provides a heat sink for removing heat from the hot melt adhesive bead so that heat-sensitive seating materials can be used in the trim cover.

Still yet another feature and advantage of the invention is that the method of manufacturing the seat can be practiced with tooling that is relatively simple and inexpensive.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
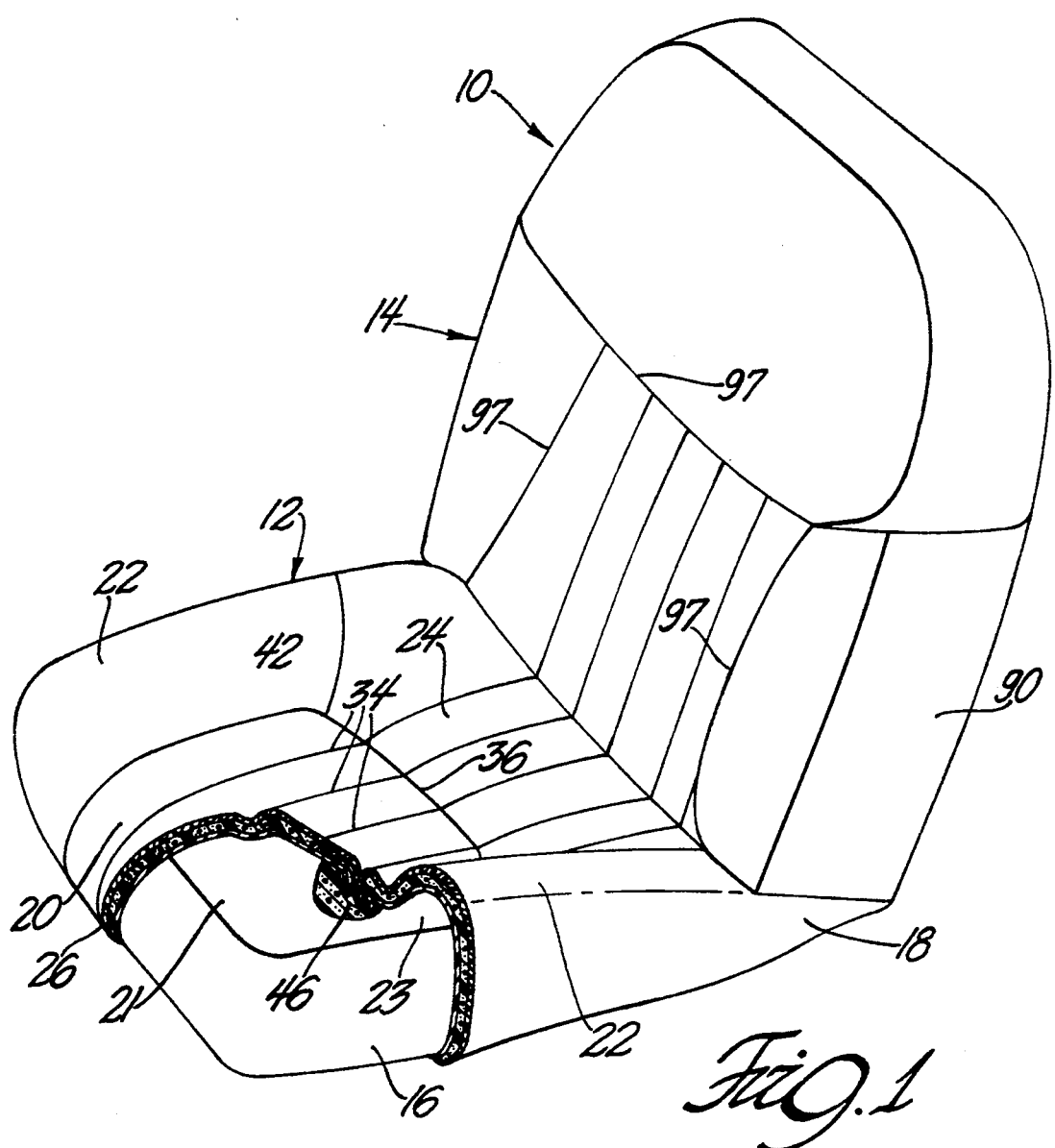
FIG. 1 is a perspective view of an automotive seat assembly having seat cushion and back that are constructed in accordance with the invention.
Figure 2:
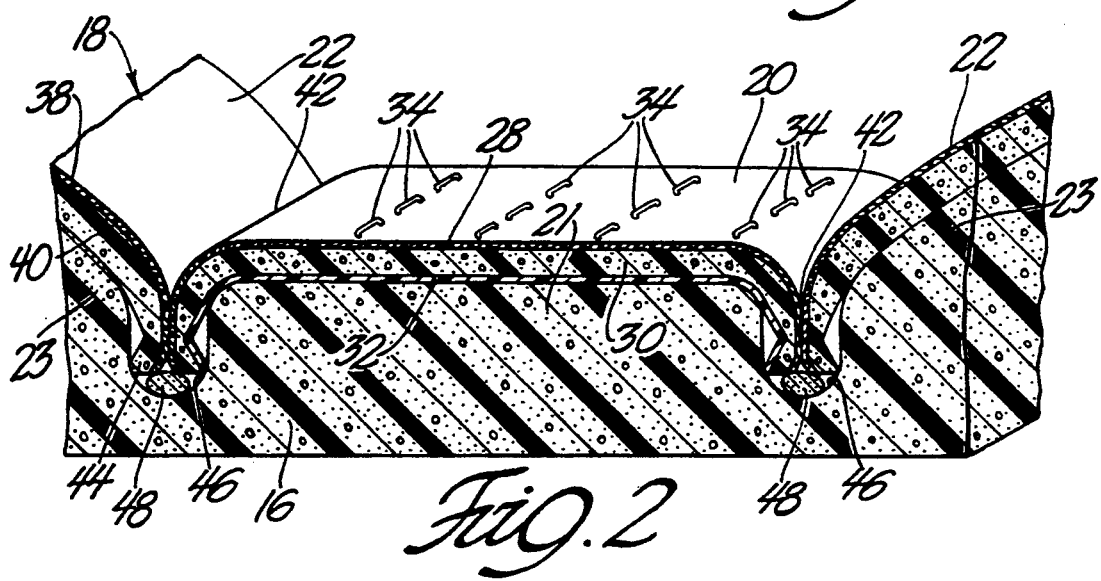
FIG. 2 is an enlarged sectional view of a portion of the seat cushion that is shown in FIG. 1.

Referring now to the drawings and more particularly to FIGS. 1 and 2, an automotive seat assembly 10 comprises a seat cushion 12 and a seat back 14 that are constructed in accordance with this invention. The seat 12 comprises a foam cushion 16, commonly called a "bun", and a trim cover 18 for the foam cushion 16. The trim cover 18 is a cut-and-sewn type trim cover comprising several panels that are sewn together. Thus, it includes a center panel 20 that covers a corresponding center portion 21 of the seating surface of the foam cushion 16 and two side panels 22 that cover the side bolsters 23 and sides of the foam cushion 16 and wrap under the seat 12 for attachment to the bottom of the seat 12. The trim cover 18 further includes a back panel 24 that covers the rear portion of the seating surface and wraps under the seat 12, and a front panel 26 that covers the lower portion of the front of the seat 12.

The foam cushion 16 is usually made of an elastomeric polyurethane foam but can be made of any other suitable elastomeric foam material. The trim cover 18 can be made of a fabric, leather, vinyl or other suitable thermoplastic material and can include a foam backing and other backing materials.

In this particular instance, the trim cover 18 is a high level or upscale trim cover having a center panel 20 and back panel 24 of trilaminate construction comprising a fabric outer layer 28 with a foam backing layer 30 of expanded vinyl foam or the like and a thin back sheet or film 32 that is slippery. These panels have a series of parallel stitch lines 34 for ascetic purposes, and the film 32 enables the trilaminate material to slide through the stitching machine to facilitate the stitching operation. These films are well know in the automotive seating art.

The front and back panels 20 and 24 have their adjacent side edges abutted face-to-face and sewn together to form a style crease 36 across the seating surface which is much deeper that the stitch lines 34 and a salvage end projection (not shown) at the undersurface.

The side panels 22 comprise a fabric outer layer 38 and a foam backing layer 40. However, the side panels are not of laminated construction and do not include a slippery film because these panels do not have any decorative stitching. The side panels 22 are sewn to the opposite sides of the front and back panels 20 and 24 by having their respective adjacent side edges abutted face-to-face and sewn together to form two deep side style creases 42 generally parallel to the seating surface and salvage end projections 44 at the undersurface as shown in FIGS. 1 and 2.

The foam cushion 16 is shaped, preferably in a molding operation, so that the seating surface is contoured and includes three recesses in the form of deep stylizing grooves 46 that are generally in an H-shaped pattern corresponding to the pattern of the styling creases 36 and 42 so as to receive the salvage end projections beneath the styling creases.

The trim cover 18 conforms to the seating surface of the foam cushion 16 by virtue of two mechanisms. Firstly, the seating portion of the trim cover 18 is bonded to the seating surface of the foam cushion 16 in the deep stylizing grooves 46 by a hot melt adhesive bead 48, as described below. This attaches the seating portion of the trim cover 18 to the seating surface of the foam cushion 16 securely so that the seating portion of the trim cover 18 (particularly center panel 20 and rear panel 24) does not shift with respect to the seating surface of the foam cushion 16 during use and cause premature wear of the foam cushion. The bonding of the trim cover 18 to the foam cushion 16 in the deep stylizing grooves 46 also enhances the deep style creases 36 and 42 and the sculptured effect that is best shown in FIGS. 1 and 2. The bonding of the trim cover 18 to the foam cushion 16 in the recesses provided by the deep stylizing grooves 46 particularly in the groove for the cross crease 36 also avoids the possibility of discomfort to the seat occupant from the hot melt adhesive which hardens when it cures.

It should also be noted that there is a substantial bond of foam-to-foam between the ends of the salvage end projections 44 and the bottoms of the grooves 46.

Figure 3:
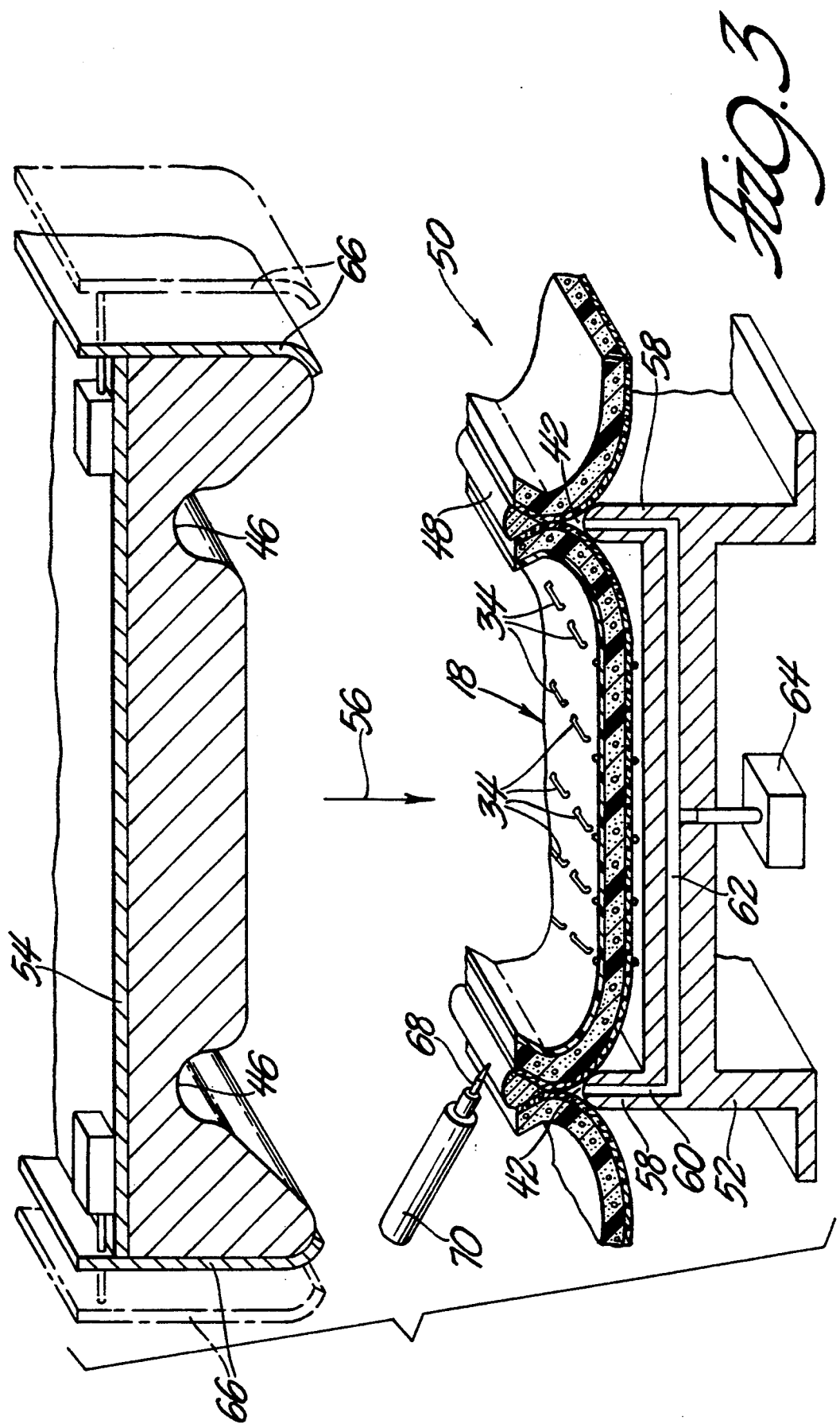
FIG. 3 is a sectional view of apparatus in the process of constructing the seat cushion of the automotive seat shown in FIGS. 1 and 2 in accordance with the invention.

Referring now to FIG. 3, an apparatus suitable for making the seat cushion 12 of FIGS. 1 and 2 in accordance with the invention is disclosed. This apparatus, which is generally indicated at 50, comprises a lower stationery fixture 52 and a moveable upper or overhead fixture 54 that raises and lowers hydraulically as indicated by the arrow 56.

The lower stationery fixture 52 has three support rails 58, two of which are shown. These support rails 58 substantially duplicate the generally H-shaped pattern of the style creases 36 and 42 in the trim cover 18, and the corresponding patterns of the style grooves 46 in the foam bun 16 and the style creases of the finished seat cushion 12.

The lower fixture 52 has a large number of small holes 60 leading from the surface of the rails 58 to a vacuum chamber 62 that is exhausted by a pump 64 to hold the trim cover 18 in place on the rails 58 of the lower fixture 52 as shown in FIG. 3.

The upper or overhead fixture 54 includes two spaced, laterally moveable channels 66 for holding the foam cushion 16 during the initial stages of the manufacturing process.

The apparatus further comprises a hot melt gun 68 that is attached to a robotic arm 70. The robotic arm 70 moves the hot melt gun 76 over the back or inside surface of the trim cover 18 that is supported upside down on the rails 56 of the lower fixture 52 and held in place by vacuum in a predetermined pattern that can be programmed into a suitable control for the robotic arm 70 in a well known manner.

The foam cushion 16 is loaded into the upper fixture 54 and the trim cover 18 is placed upside down on the lower fixture 52 so that the style creases 36 and 42 are supported on the rails 58 and held in position by vacuum pressure or some other suitable clamping means.

The hot melt gun 76 then applies a bead of molten hot melt adhesive in a predetermined pattern. In this instance, several continuous beads of hot melt adhesive are applied along the respective salvage ends corresponding to the style creases 36 and 42 that are supported and held in position on the rails 58 of the lower fixture 52. These rails have a pattern that corresponds to the generally H-shaped pattern of stylizing grooves 46 in the foam cushion 16 and the pattern of style creases 36 and 42 as shown in FIGS. 1, 2 and 3.

A suitable hot melt material is Bostik HM 7239, which is a product of Bostik Company of Boston, Mass. and which can generally be described as a granular polyamide adhesive. This hot melt has been successfully applied in continuous beads that were nominally 3/8 inch wide and weighed about 7 grams per linear foot. However, experience may show that a lesser amount is satisfactory. This hot melt is applied in the range of 340° F. to 390° F. and preferably in the range of about 350° F. to 360° F.

It is also possible that other hot melt adhesives can be used, in which case adjustments in the various temperatures, pressures and amounts may have to be made.

After the hot melt beads 48 are formed in the desired pattern on the back or inside of the trim cover 18, the overhead fixture 54 is lowered, laying the foam bun 16 on the adhesively treated trim cover 18. The channels 66 are moved outwardly, releasing the foam bun 16. The trim cover 18 and the foam cushion 16 are pressed together to insure intimate contact of the trim cover 18 and the foam cushion 16 with the hot melt beads 48. This is usually signalled by a flattening of the hot melt beads 48 as best shown in FIG. 2. An adequate pressure for pressing the trim cover 18 and the foam cushion 16 together (with the hot melt beads 48 sandwiched between) is in the range of about 4.5 psi to about 7.0 psi.

The hot melt adhesive is cured by cooling. Consequently, the process involves two important times. The first time is the open time, that is, the time between which the hot melt beads 48 are applied to the trim cover 18 and the trim cover 18 is pressed against the foam cushion 16. This open time should not allow the hot melt adhesive to cool below about 250° F. and preferably not below about 275° F. to allow for a margin of error which can be described as the critical contact temperature of the material. Such open time then is in the range of about 10 seconds to about 30 seconds at the above-noted preferred hot melt adhesive application temperature range.

The second important time is the closed time, that is, the time that the trim cover 18 and the foam cushion 16 are pressed together so that the hot melt cures sufficiently for good adhesion. This closed time should not be less than the time it takes the hot melt adhesive to cool to about 180° F., which can be described as the set temperature of the material. Such closed time is in the range of about 60 seconds to about 97 seconds.

The closed time can be altered by the selection of the materials for the lower fixture 52, particularly the rails 58, which can be made of steel, aluminum, thermoplastic, etc. The lower fixture 52 is preferably a heat sink so that the closed time can be reduced. In this regard, an aluminum fixture or at least aluminum rails is preferable. When the hot melt adhesive is cured, the upper fixture 54 is raised and the seat cushion 12 is removed from the lower fixture 52. The seat cushion 12 is then finished in a conventional manner by wrapping the side panels 22, back panel 24 and front panel 26 of the trim cover 18 around the sides, back and front of the foam cushion 16 and attaching them to the bottom of the seat.

Figure 4:
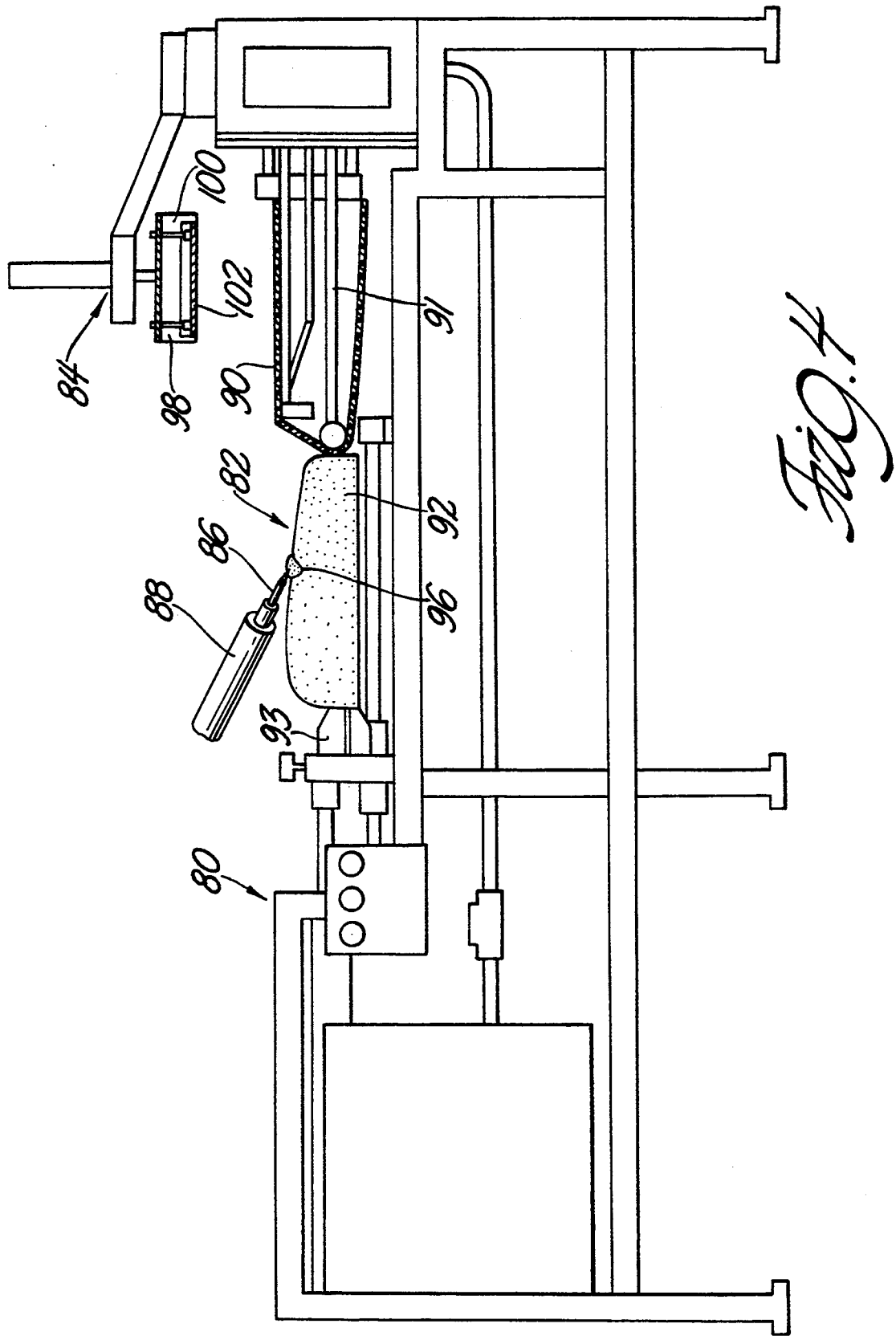
FIG. 4 is a side view of apparatus in the process of constructing the seat back of the automotive seat shown in FIGS. 1 and 2 in accordance with the invention.

Referring now to FIG. 4, it shows a side view of apparatus 80 in the process of constructing the seat back 14 of the automotive seat shown in FIGS. 1 and 2 in accordance with the invention.

Figure 5:
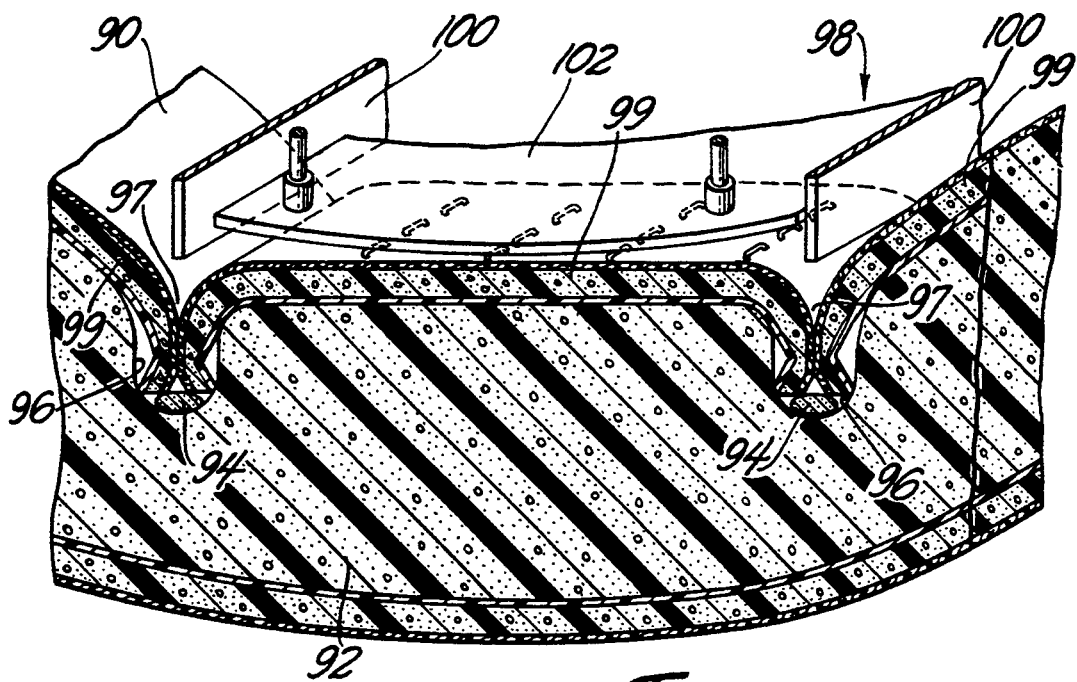
FIG. 5 is a fragmentary sectional view of the apparatus and seat back shown in FIG. 4 at a later stage of manufacture.

The apparatus 80 comprises a roller stuffer assembly 82, a press 84 and a hot melt gun 86 attached to a robotic arm 88. Here the seat back 14 of the seat assembly 10 is constructed using a trim cover 90 in the form of a cut and sewn envelope that is turned inside out and loaded on a laterally translatable fixture 91 of the roller stuffer assembly 82, which is a piece of equipment that is well known in the automotive seat manufacturing art. The foam cushion or bun 92 for the seat back 14 is loaded on a longitudinally translatable fixture 93 of the roller stuffer assembly 82. After loading, the laterally translatable fixture 91 carrying the inside-out trim cover 90 is then translated laterally so that it is longitudinally aligned with the longitudinally translatable fixture 93 carrying the foam bun 92 for the seat back 14 as shown in FIG. 4. The foam bun 92 has three styling grooves 96 that correspond to the three respective style creases 97 in the trim cover 90 that are shown in FIG. 1. These style creases 97 result from adjacent panels 99 of the cover 90 having their adjacent side edges abutted face-to-face and sewn together as shown in FIG. 5. Several continuous hot melt beads 94 are also applied to respective stylizing grooves 96 in the seating surface of the foam bun 92 by the suitably controlled hot melt gun 86 and robotic arm 88 at this time. After the hot melt beads 94 are applied, the longitudinally translatable fixture 93 is then moved into the aligned laterally translatable fixture 91 simultaneously stuffing the foam bun 92 inside the trim cover 90 as the trim cover 90 is turned right side out. As indicated above, the roller stuff assembly 91 and its mode of operation are well known in the automotive seating art.

After the adhesively-treated foam bun 92 has been stuffed inside the trim cover 90 as shown in FIG. 5, the press 84 is then lowered to press the trim cover 90 and the foam bun 92 together so that there is intimate contact with the hot melt beads 40 behind the seating surface of the trim cover 90.

This is accomplished by a tool 98 carried by the press 84 comprising rails 100 that duplicate the pattern of the style creases 97 in the seating surface of the trim cover 90 and the corresponding pattern of deep styling grooves 96 in the seating surface of the foam bun 92. The rails 98 engage the style creases 97 in the seating surface of the trim cover 90 and press the underling salvage ends against the hot melt beads 94 and facing surface of the foam cushion 92 so that the facing portion 98 is secured to the foam cushion 92 at the bottom of the stylizing grooves 94 by the hot melt adhesive when it cools. This enhances the style creases 97 and the sculptured effect of the seat back 14 as shown in FIGS. 1 and 5.

The seat back cover 90 and bun 92 are made of the same materials as the seat cushion 12 and the same open and closed times apply. In this regard, it should be noted that the central seating panel 99 is decoratively stitched as before. However, all panels of the seat back cover 90 are made of the trilaminate material to assist the stuffing operation. Moreover, the tool 98 or at least the rails 100 are also preferably a heat sink as before.

Neither the lower fixture 52 of the apparatus of FIG. 3 nor the tool 90 of the apparatus of FIGS. 4 and 5 need to conform to the finished shape of the respective seat cushion 12 and seat back 14. It is merely necessary for the rails to bring the salvage ends of the respective trim cover, the hot melt bead or beads and the foam buns into intimate contact when the trim covers and the foam buns are pressed together. In some instances, it may also be necessary or desirable to augment the adhesion of the trim cover to the foam cushion by the hot melt beads. This is particularly so in connection with convex portions of the foam bun such as often occurs in the rear portion of the seat cushion or the lumbar region of the seat back.

This augmentation is easily accomplished, for example in connection with seat back 14, by programming the control for the hot melt gun 86 and the robotic arm 88 so that the hot melt adhesive is also sprayed on the convex lumbar portion of the foam bun 92 when the hot melt beads 96 are applied. A spring biased press plate 102 is also added to the tool 98 carried by the press 84 so that the lumbar portion of the seat back cover 90 is pressed against the convex lumbar portion of the foam bum 92 when the trim cover 90 and the foam bun 92 are pressed together by the rails 100.

Figure 6:
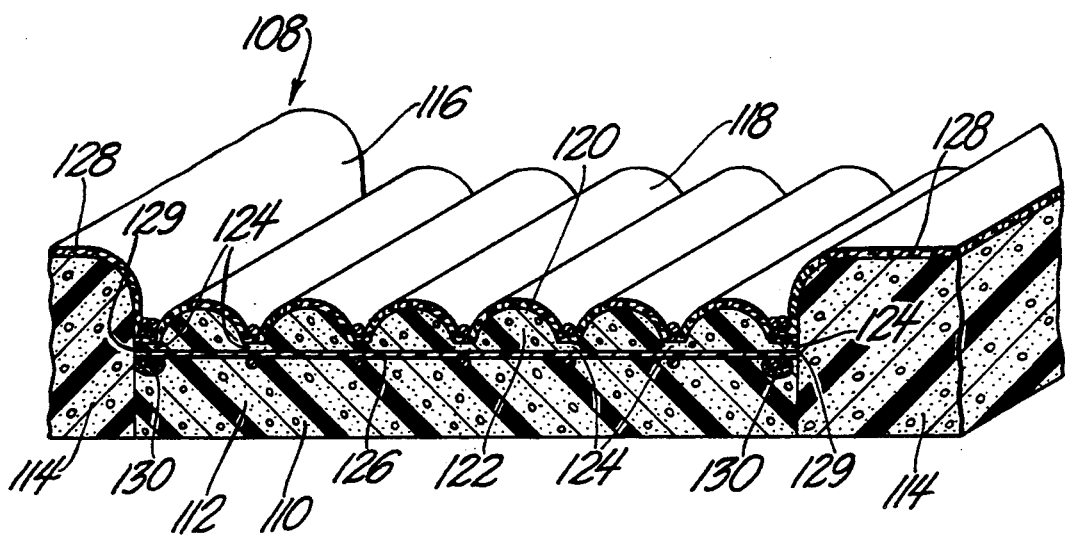
FIG. 6 is an enlarged sectional view of a portion of another seat cushion that is made in accordance with the invention.

Referring now to FIG. 6, a portion of another seat cushion 108 that is made in accordance with the invention is shown in enlarged section. In this instance, the foam bun 110 is mechanically shaped and comprises a center section 112 and two enlarged end sections 114 that are adhesively bonded together. In this instance, the trim cover 116 also includes a central panel 118, but the central panel 118 is in the form of a sew pad comprising a fabric covering 120, a thin foam backing 122 with parallel grooves 124 in the seating surface and a slippery backing layer 126. The sides of the sew pad terminate in the outermost grooves 124 so that the sides of the central panel 118 have salvage and projections 128 formed by the three layers being sewn together. The fabric covering 120 is also sewn to the foam backing 122 and backing layer 126 at the parallel grooves 124 to provide a decorative ribbed surface for the central panel 118. The central panel 118 also has a style crease across the sew pad that is similar to the crease 36 shown in FIG. 1 and that is made simply by stitching across the sew pad to compress the foam backing 122 between the fabric covering 120 and the backing layer 126.

The trim cover 116 includes side panels 128 comprising a single layer of fabric. The side panels 128 are sewn to opposite sides of the central panel 118 at the salvage end projections 129 of the sew pad that are formed by terminating the sides of the sew pad in outermost grooves 124.

The trim cover 116 is attached to the foam bun 110 by applying a hot melt adhesive bead 130 to the salvage end projections 129 and to the undersurface of the style crease across the sew pad. The adhesively treated cover is then pressed against the foam bun 110 so that the salvage ends 129 carrying the hot melt adhesive beads 130 are pushed into corners formed by the enlarged end sections 114 and so that the style crease with its hot melt adhesive bead is pressed into a corresponding stylizing groove in the seating surface of the center section 112 of the mechanically shaped foam bun 110. Again, this is done by a tool that has rails that correspond to the matching patterns of the three hot melt adhesive beads 130, the three stylizing grooves in the foam bun 110 and the three style creases in the seat cushion 108 at the respective sides of and across the central panel 118.

In this embodiment, it should be noted that the hot melt beads 130 at the sides of the central panel 118 are effectively located in deep grooves formed by the enlarged end sections 114 of the foam bun 110 and the outermost ribs of the foam backing 122. These grooves protect the seat occupant from any possible discomfort from the hot melt beads 130 at the sides of the sew pad which harden when set as indicated above.

Figure 7:
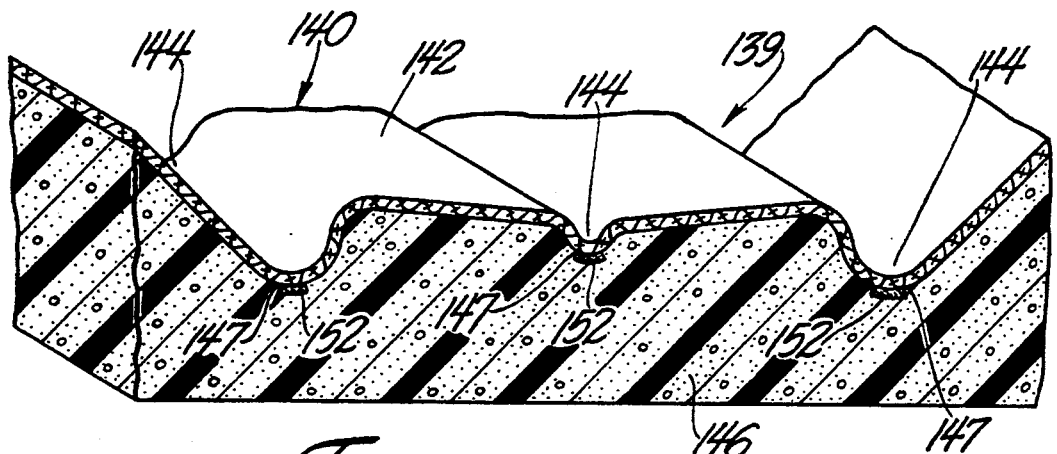
FIG. 7 is an enlarged sectional view of a portion of still another seat cushion that is made in accordance with the invention.
Figure 8:
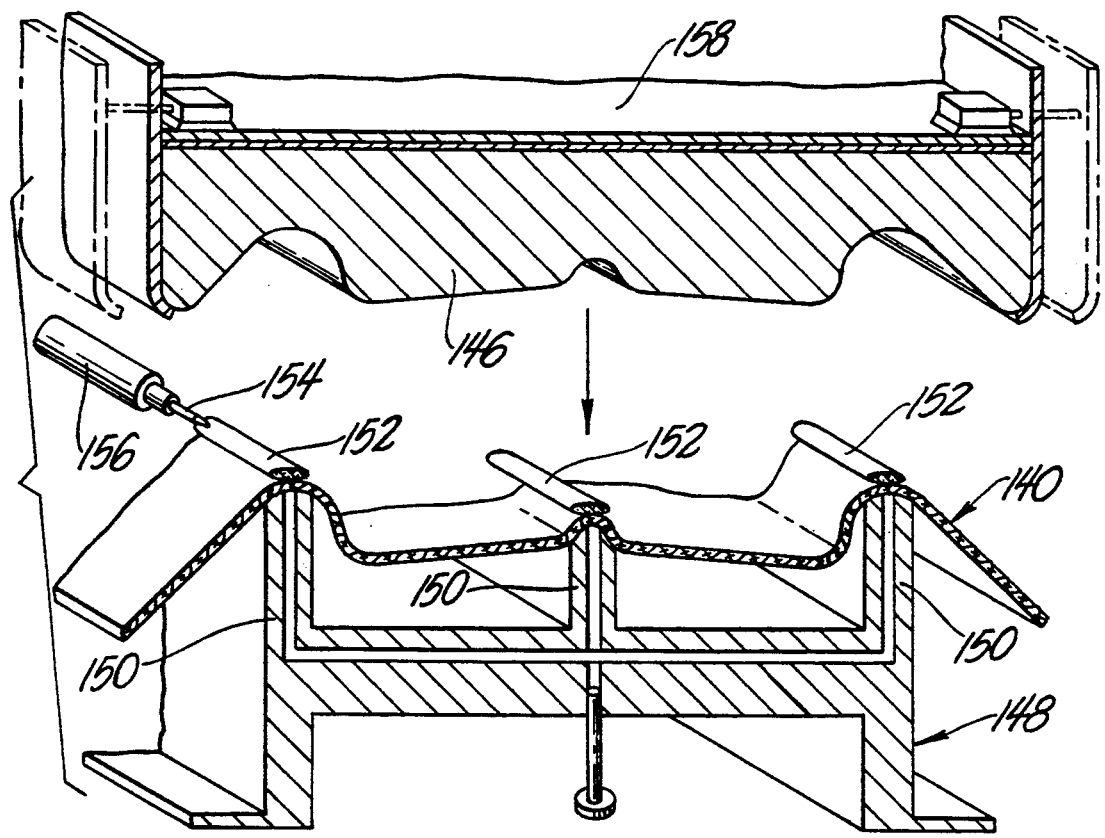
FIG. 8 is a sectional view of apparatus in the process of constructing the seat cushion shown in FIG. 7.

FIGS. 7 and 8 show still another seat cushion 139 that is made in accordance with the invention in enlarged section. In this instance, the cover 140 has a seating portion 142 of one piece leather construction and consequently the cover lacks any creases or salvage ends for creating style lines. However, style lines 144 still may be created with single panels by forming the foam bun 146 with style grooves 147 in the desired locations. The cover 140 is then supported upside down on a fixture 148 that has support rails 150 that duplicate the desired pattern of the style grooves 147. As shown in FIG. 8, the cover 140 is held in position pneumatically and hot melt adhesive beads 152 are to the back side of the cover 140 in the same pattern by a suitably controlled hot melt gun 154 that is maneuvered by a robot.

After the hot melt beads 152 are applied, the trim cover 140 and the foam bun 146 are pressed together by a moveable overhead fixture 158 that releasably holds the foam bun 146. When the hot melt adhesive is cured, the overhead fixture 158 is raised and the seat cushion 139 is removed from the fixture 148.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of manufacturing a seat assembly that has a foam bun and a trim cover for the foam bun that has a seating surface attached to a seating surface of the foam bun, comprising:
   applying a molten hot melt adhesive bead to an inner surface of the seating portion of the trim cover or to the seating surface of the foam bun in a predetermined pattern,
   pressing the trim cover and the foam cushion together in the area of the predetermined pattern while the adhesive is still molten with a tool having rails arranged in the predetermined pattern so that the trim cover and the foam bun have intimate contact with the hot melt adhesive bead, and
   holding the trim cover and the foam cushion in intimate contact with the hot melt adhesive bead for a predetermined amount of time while the hot melt adhesive cools and thereby bonding the trim cover to the foam cushion and enhancing style conformations for the seating potion of the seat assembly.

2. The method as defined in claim 1 wherein the bonding of the trim cover to the foam bun by cooling of the hot melt adhesive constitutes the sole means for attaching the seating portion of trim cover to the facing surface of the foam bun.

3. The method as defined in claim 1 wherein the tool pressing the trim cover and the foam bun together is a heat sink that facilitates cooling the hot melt bead.

4. The method as defined in claim 1 wherein additional hot melt adhesive is sprayed on a convex surface of the foam bun when the hot melt adhesive bead is applied.

5. The method as defined in claim 1 wherein the hot melt adhesive is applied at a temperature in the range of 340° F. to 390° F.

6. The method as defined in claim 1 wherein the hot melt adhesive is applied at a temperature in the range of 350° F. to 360° F.

7. The method as defined in claim 1 wherein the trim cover and the foam bun are pressed together while the hot melt adhesive is at least about 250° F.

8. The method as defined in claim 1 wherein the trim cover and the foam bun are pressed together while the hot melt adhesive is at least about 275° F.

9. The method as defined in claim 1 wherein the trim cover and the foam bun are pressed together within a range of about 10 seconds to about 30 seconds from the time that the hot melt adhesive is applied.

10. The method as defined in claim 1 wherein the trim cover and the foam bun are pressed and held together by a pressure in the range of about 4.5 psi to about 7.0 psi.

11. The method as defined in claim 1 wherein the trim cover and the foam bun are held together until the hot melt material cools to about 180° F.

12. The method as defined in claim 1 wherein the trim cover and the foam bun are held together in the range of about 60 seconds to about 97 seconds.

13. The method as defined in claim 1 wherein the trim cover has a seating portion comprising a plurality of panels whose adjacent side edges are abutted and sewed together to define salvage end projections that are arranged in the predetermined pattern and bonded to the foam bun by the hot melt adhesive bead when it cools.

14. The method as defined in claim 1 wherein the foam bun has conformations arranged in the predetermined pattern so that the trim cover is bonded to the foam bun in such conformations to avoid discomfort to the seat occupant after the hot melt adhesive bead cools and hardens.

15. A method of manufacturing a sculptured seat assembly having a foam bun that includes raised side bolsters and a trim cover for the foam bun having a seating portion covering a seating surface of the foam bun including part of the side bolsters comprising:
   applying a molten hot melt adhesive bead an inner surface of the seating portion of the trim cover or the seating surface of the foam bun in a predetermined pattern that includes side beads at the inner ends of the bolsters at a temperature in the range of 340° F. to 390° F.,
   pressing the trim cover and the foam cushion together in the area of the predetermined pattern before the hot melt adhesive cools below about 250° F. with a tool that has rails arranged in the predetermined pattern so that the trim cover and the foam cushion have intimate contact with the hot melt adhesive bead, and
   holding the trim cover and foam cushion in intimate contact with the hot melt adhesive while the hot melt adhesive cools to about 180° F. to bond the trim cover to the foam cushion.

16. The method of as defined in claim 15 wherein the hot melt adhesive is applied at a temperature in the range of 350° F. to 360° F.

17. The method as defined in claim 15 wherein the trim cover and the foam cushion are pressed together before the hot melt adhesive cools to about 275° F.

18. The method as defined in claim 15 wherein the trim cover and the foam cushion are pressed and held together by a pressure in the range of about 4.5 psi to about 7.0 psi.

19. A method of manufacturing a seat assembly that has a foam bun and a trim cover for the foam bun that has a seating portion covering a seating surface of the foam bun comprising:
   shaping the foam bun so that the seating surface includes styling conformations in a predetermined pattern,
   applying a molten hot melt adhesive bead to an inner surface of the seating portion of the trim cover in the predetermined pattern or to the conformations in the seating surface of the foam bun at a temperature in the range of 340° F. to 390° F.,
   pressing the trim cover and the foam cushion together with a range of about 10 seconds to about 30 seconds from the time that the hot melt adhesive is applied with a tool that has rails arranged in the predetermined pattern so that the trim cover and the foam bun have intimate contact with the hot melt adhesive bead, and
   then holding the trim cover and foam bun in intimate contact with the hot melt adhesive in the range of about 60 seconds to about 97 seconds while the hot melt adhesive cools to bond the trim cover to the foam cushion.

20. The method as defined in claim 19 wherein the hot melt adhesive is applied at a temperature in the range of 350° F. to 360° F.

21. The method as defined in claim 19 wherein the trim cover and the foam cushion are pressed and held together by a pressure in the range of about 4.5 psi to about 7.0 psi.

* * * * *